(12) United States Patent
Grego et al.

(10) Patent No.: US 11,215,418 B1
(45) Date of Patent: Jan. 4, 2022

(54) FIRING PIN INDENT GAUGE

(71) Applicant: U.S. Government as Represented by the Secretary of the Army, Dover, NJ (US)

(72) Inventors: Thomas C. Grego, Chester, NJ (US); Christopher Gandy, Rockaway, NJ (US); Brian Donovan, Stroudsburg, PA (US); Adrial Kirchen, Parlin, NJ (US); Jeffrey Kinsberg, Clarksburg, NJ (US); Andrew Orsini, East Windsor, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 150 days.

(21) Appl. No.: 16/556,548

(22) Filed: Aug. 30, 2019

(51) Int. Cl.
*G01L 1/16* (2006.01)
*F41A 31/00* (2006.01)
*G01L 5/00* (2006.01)

(52) U.S. Cl.
CPC ............... *F41A 31/00* (2013.01); *G01L 1/16* (2013.01); *G01L 5/0052* (2013.01)

(58) Field of Classification Search
CPC . G01L 5/14; F41A 31/00; F41A 23/16; F41G 3/32; F41G 5/26
See application file for complete search history.

(56) References Cited

U.S. PATENT DOCUMENTS

| | | | | |
|---|---|---|---|---|
| 3,863,499 A | * | 2/1975 | Von Boutteville | F41A 31/00 73/167 |
| 4,030,097 A | * | 6/1977 | Gedeon | F41G 3/12 73/167 |
| 4,263,807 A | * | 4/1981 | Brown | G01N 3/12 73/167 |
| 4,286,687 A | * | 9/1981 | Fiske, Jr. | G01V 1/133 73/649 |
| 4,342,223 A | | 8/1982 | Smith | |
| 4,379,405 A | * | 4/1983 | Engeler | G01L 5/14 73/167 |
| 4,621,519 A | * | 11/1986 | Phillips | G01L 23/10 73/754 |
| 4,686,886 A | * | 8/1987 | Caserza | F41A 31/00 73/167 |
| 4,850,229 A | * | 7/1989 | Phillips | G01L 5/14 73/756 |
| 4,894,938 A | | 1/1990 | Davis | |
| 5,054,224 A | * | 10/1991 | Friar | F41A 21/02 42/76.02 |
| 5,271,283 A | * | 12/1993 | Ault | G01L 5/0052 73/744 |
| 5,761,954 A | * | 6/1998 | Dvorak | G01L 5/22 73/167 |

(Continued)

OTHER PUBLICATIONS

"MIL-DTL-74486A", Aug. 5, 2009, p. 12. (Year: 2009).*

*Primary Examiner* — Tran M. Tran
(74) *Attorney, Agent, or Firm* — John P. DiScala

(57) ABSTRACT

An in-weapon sensor enables electronic measurement of the firing pin indent force of a weapon system. The in-weapon sensor measures, either directly or indirectly, the indent force of the firing pin and communicates the information outside of the weapon to a data capture device. The data capture device provides a visual indication as to whether the firing pin indent force is sufficient or insufficient.

19 Claims, 6 Drawing Sheets

(56) References Cited

U.S. PATENT DOCUMENTS

| | | | | |
|---|---|---|---|---|
| 6,064,196 A * | 5/2000 | Oberlin | .................... | G01P 3/665 |
| | | | | 73/167 |
| 6,386,028 B2 * | 5/2002 | Kolbe | .................... | F41A 31/02 |
| | | | | 73/167 |
| 6,561,071 B1 * | 5/2003 | Norton | .................... | F41A 31/00 |
| | | | | 73/167 |
| 6,644,111 B2 * | 11/2003 | Cytron | .................... | F41A 21/32 |
| | | | | 73/514.26 |
| 6,817,239 B2 * | 11/2004 | Glock | ...................... | G01L 1/16 |
| | | | | 73/649 |
| 6,925,887 B1 * | 8/2005 | Coffey | ...................... | G01L 5/14 |
| | | | | 73/861.47 |
| 6,973,749 B2 * | 12/2005 | Levilly | .................... | F41A 23/16 |
| | | | | 42/94 |
| 8,033,207 B1 * | 10/2011 | Smith | ...................... | F41A 15/14 |
| | | | | 89/28.1 |
| 8,176,667 B2 * | 5/2012 | Kamal | .................... | F41C 23/22 |
| | | | | 42/1.01 |
| 8,356,437 B1 * | 1/2013 | Holmes | .................... | F41A 9/53 |
| | | | | 42/1.01 |
| 8,464,451 B2 * | 6/2013 | McRae | .................. | F41A 17/06 |
| | | | | 42/1.01 |
| 8,935,958 B2 * | 1/2015 | Downing | ................ | G01P 3/665 |
| | | | | 73/167 |
| 9,335,230 B1 * | 5/2016 | Hooke | .................... | F42B 14/02 |
| 9,500,430 B2 * | 11/2016 | Righi | .................... | F41A 17/063 |
| 10,704,855 B2 * | 7/2020 | Amburgey | .............. | F41A 23/16 |
| 2019/0226792 A1 * | 7/2019 | Dvorak | .................. | F41A 33/06 |

* cited by examiner

FIRING PIN INDENT GAUGE

STATEMENT OF GOVERNMENT INTEREST

The inventions described herein may be manufactured, used and licensed by or for the United States Government.

FIELD OF THE INVENTION

The invention relates in general to sensing devices and in particular to firing pin sensing devices.

BACKGROUND OF THE INVENTION

Gauging of weapon systems is critical to ensuring that under-performing, malfunctioning or damaged weapon system or components are identified. A firing pin indent gauge checks the force exerted by the weapon system's firing pin to the primer of a munition. Failure to exert enough energy may result in a misfire of the ammunition. Exerting excessive energy may cause damage to the ammunition. Gauging is also useful in ammunition testing as a way to ensure proper functioning of the testing weapon.

The legacy method of gauging firing pin indent relies on the availability and use of copper cylinders. In this method, a copper cylinder is physically contacted by the firing pin and an indent is made in the copper cylinder. The depth of the indent is measured and correlated to a corresponding firing pin energy.

There are some significant downsides to this approach. The process is labor intensive and involves multiple operator-performed steps including positioning the cylinder, performing the test, measuring the indent, correlating the measurement and recording the information. In addition, the copper cylinders are not reusable and must be replaced after each single use. Finally, accuracy of results may be affected by manual errors in measuring or in material differences between cylinder lots.

A need exists for a system for measuring a firing pin operational parameters, such as force, impulse and energy, which is reusable, less manually intensive than traditional approaches, accurate and scalable.

SUMMARY OF INVENTION

One aspect of the invention is a sensor assembly for measuring an operational parameter of a firing pin of a weapon system. The sensor assembly includes a housing, an impact nose, a sensor, a load bypass sleeve and a communication interface. The housing is sized and dimensioned to fit within a chamber of the weapon system and defining an interior cavity. The impact nose is at a forward end of the housing and has an exposed front surface for receiving an impact load from the firing pin. The impact nose transfers the impact load to the housing. The sensor is located within the interior cavity of the housing and senses an effect of the impact load. The load bypass sleeve substantially surrounds the impact nose and is positioned to receive an impact load from a bolt of a weapon system. A communication interface transmits data corresponding to a sensed effect from the sensor assembly.

Another aspect of the invention is a system for measuring an operational parameter of a firing pin of a weapon system. The system comprises a sensor assembly, a guide tube, a communication interface, a pretensioner assembly and a data capture device. The housing is sized and dimensioned to fit within a chamber of the weapon system and defining an interior cavity. The impact nose is at a forward end of the housing and has an exposed front surface for receiving an impact load from the firing pin. The impact nose transfers the impact load to the housing. The sensor is located within the interior cavity of the housing and senses an effect of the impact load. The load bypass sleeve substantially surrounds the impact nose and is positioned to receive an impact load from a bolt of a weapon system. A communication interface transmits data corresponding to a sensed effect from the sensor assembly. The guide tube extends aft of the housing and is sized and dimensioned for being received within and extending beyond a barrel of the weapon. The guide tube is generally a hollow cylinder with the hollow interior receiving a communication cable of the communication interface. A pretensioner assembly defines a hollow central cavity sized and dimensioned to receive a portion of the guide tube. The pretensioner assembly applies a preload on the sensor assembly. The data capture device receives data corresponding to the sensed effect and provides an indication of the indent force of the firing pin.

Another aspect of the invention is a method for measuring an operational parameter of a firing pin of a weapon system. The method comprises the steps of: inserting an in-weapon sub-system into the weapon system such that a sensor assembly of the in-weapon system is seated in the chamber and a guide tube coupled to the sensor assembly extends through a barrel of the weapon system; applying a preload to the sensor assembly; establishing a communication interface between the sensor assembly and a data capture device; performing a firing test; communicating test information corresponding to the operational parameter of the firing pin to the data capture device; and indicating the test information The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION

An in-weapon sensor enables electronic measurement of the operational parameters of a firing pin of a weapon system. The in-weapon sensor measures, either directly or indirectly, the force, impulse and/or energy of the firing pin and communicates the information outside of the weapon to a data capture device. The data capture device provides a visual indication as to whether the operation of the firing pin is sufficient or insufficient.

Advantageously, the system employs a reusable in-weapon sensor. Unlike traditional copper cylinder gauges, the sensor may be reused multiple times with only a consumable nose portion needing replacement. The nose portion is constructed to minimize impact on the firing pin by the testing process. Additionally, the nose portion is made from relatively low cost materials and has less stringent material property requirements compared to traditional copper cylinder gauges.

Additionally, the sensor enables a simpler and more efficient gauging process as the process. Compared to legacy solutions, the testing system does not require as many discrete manually performed processes. Operators are no longer required to manually measure, correlate and record information.

Similarly, the test results do not require manual interpretation. The legacy solution requires an operator to manually measure the depth of indent. This process is rife with inconsistencies due to non-uniform indents and subjective operator judgment. With the system and methods described below, the performance of the firing pin is captured and interpreted by precise electronic components.

The system is employable for all systems that utilize a firing pin to initiate a firing train and in particular, to chambered weapon systems which utilize firing pins. In the embodiments shown in the figures and described below, the apparatuses, systems and methods are described in the context of an M4A1 carbine, M16 rifle and M249 squad automatic weapon. However, the invention is not limited to these weapon systems. The system is scalable to weapon systems of various calibers and geometries including but not limited to pistols, rifles, carbines, shot guns, automatic weapons, machine guns, grenade launchers and other civilian, law enforcement or military weapons. Further, the testing system is not limited to weapon systems. It is contemplated that the system may be used in other applications which employ firing pins including pyrotechnic systems, air bag initiators and chemical oxygen generators used in space travel, firefighting and rescue operations.

Figure 1:
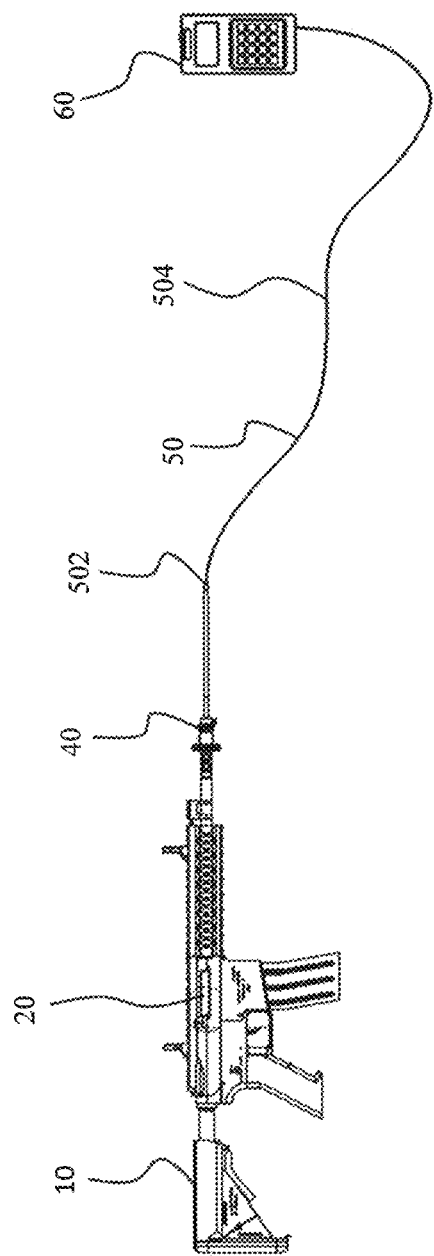
FIG. 1 is an illustration of a system for measuring the indent force of a firing pin, according to one illustrative embodiment.

FIG. 1 is an illustration of a gauging system for measuring the operational parameters of a firing pin, according to one illustrative embodiment. The system comprises an in-weapon sub-system 20 further comprising an electronic sensor assembly and a guide tube, a pretensioner assembly 40, a communication interface 50 further comprising a communication adapter 502 and a communication channel 504 and a data capture device 60. The in-weapon sub-system 20 is inserted into the weapon system 10 to sense an effect of an impact event of the firing pin which is then correlated to an operational parameter, including the indent force, impulse and/or energy of the firing pin. The operational parameter is then compared to pass/fail criteria for the firing pin. Prior to testing, the pretensioner assembly 40 is connected to the in-weapon sub-system 20 for preparing the in-weapon sub-system 20 for testing. The data capture device 60 receives test data via the communication interface 50.

The in-weapon sub-system 20 is inserted within the weapon system 10 to be tested. An electronic sensor assembly is positioned in the chamber of the weapon system 10. The rigid guide tube extends aft of the electronic sensor assembly into the barrel of the weapon system 10.

Depending on application, the electronic sensor assembly may be an indirect indent force sensor assembly or a direct indent force sensor assembly. An indirect indent force sensor assembly is strain-based and enables the handling of significantly increased forces in a package compact enough to fit within the chamber 102 of the weapon system 10. For example, the indirect force sensor assembly may be used for weapon systems firing a 5.56 caliber ammunition, such as an M4 rifle, M16 rifle or M249 light machine gun. A direct indent force sensor assembly may be used in weapon systems which support either a larger force sensor than the 5.56 caliber weapon systems or receive a smaller firing pin load than those experienced in the 5.56 caliber weapons.

Figure 2:
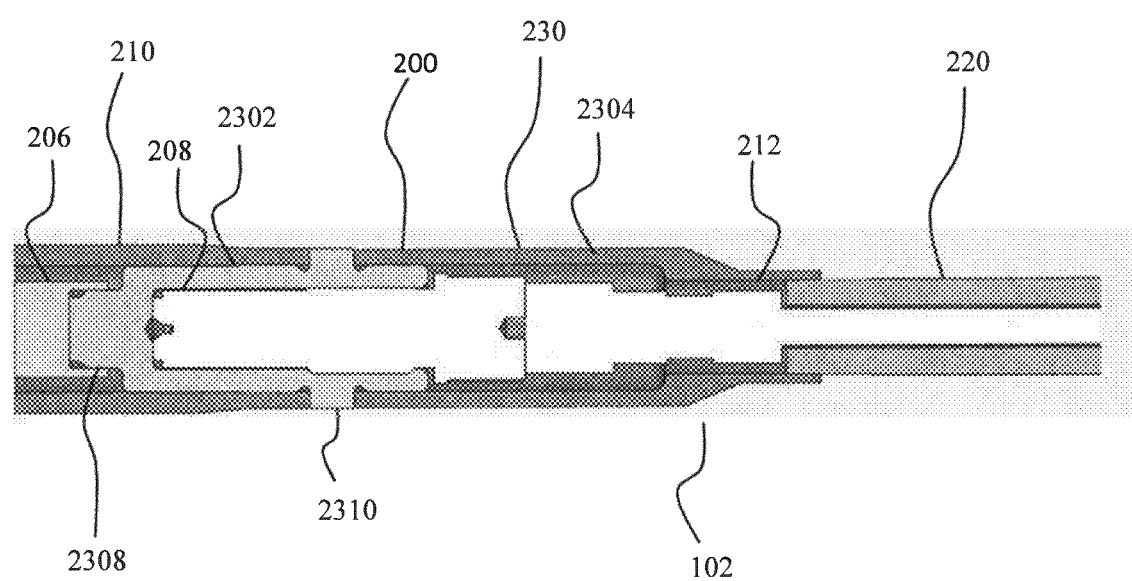
FIG. 2 is a cross-section view of an indirect indent force sensor assembly of the system of FIG. 1, according to one illustrative embodiment.

FIG. 2 is a cross-section view of an indirect indent force sensor assembly of the system of FIG. 1, according to one illustrative embodiment. The indirect indent force sensor assembly 200 further comprises a housing 230 comprising a forward housing 2302, an aft housing 2304, an impact nose 206, a strain sensor 208, a load bypass sleeve 210, a communication connector 212 and a guide tube 220.

The forward housing 2302 and the aft housing 2304 together form the housing 230 sized and dimensioned to fit within a chamber 102 of the weapon. The housing 230 must be sufficiently stiff to receive the impact load of the firing pin, protect the internal components and ensure reliable data is collected. In one embodiment, the housing 230 is formed of precipitation hardened stainless steel. While precipitation hardened steel is employed in one embodiment to achieve the necessary material properties of the housing, the housing material is not limited to precipitation hardened steel. The housing material may be any material which provides similar material properties including strength and stiffness.

The housing 230 generally conforms in shape to the chamber 102 of the weapon system and therefore to the geometry of ammunition employed in the weapon system. In the embodiment shown, the housing 230 has a generally bottleneck geometry. The housing 230 further defines an interior cavity for housing internal components of the indirect indent force sensor 200, including the piezoelectric strain sensor 208a.

The forward housing 2302 is oriented within the weapon system chamber 102 toward the firing pin. During testing, strain experienced by the impact nose 206 due to an impact by the firing pin is transmitted through the forward housing 2302 to the strain sensor 208.

The aft housing 2304 is separate from the forward housing 2302 to enable assembly of the sensor assembly 200. The aft housing 2304 is oriented within the weapon system chamber 102 toward the barrel of the weapon system 10. The aft housing 2304 transfers the load from the forward housing 2302 to the chamber 102 of the weapon system 10. The aft housing 2304 must be of a stiffness sufficient to ensure that data meets the statistical requirements. Accordingly, the aft housing 2304 is formed of a precipitation hardened steel or similarly stiff material.

The consumable impact nose 206 is forward of and in contact with the forward housing 2302. In the embodiment shown, the forward housing 2302 comprises a protrusion 2308 extending forward in an axial direction along a central longitudinal axis. The consumable impact nose 206 comprises a corresponding opening in a base of the nose such that the consumable impact nose 206 fits slidingly over the protrusion 2308.

During testing, the consumable impact nose 206 receives a load from the firing pin and transfers a strain to the forward housing 2302. In operation, the consumable impact nose 206 is designed to absorb the impact of the firing pin and deform slightly to prevent damage to the firing pin. Accordingly, the consumable impact nose 206 is replaced after each test. In one embodiment, the consumable impact nose 206 is formed from a glass reinforced polymer, such as polyetheretherketone (PEEK).

A strain sensor 208, such as a piezoelectric strain sensor, is located within the interior cavity of the housing 230 for sensing strain on the forward housing 2302 due to the load received from the consumable impact nose 206. The sensed strain is converted to an operational parameter by the data capture device based on a static calibration that is performed during acceptance testing of the electronic sensing assembly. Alternatively, in other embodiments, the sensor assembly 200 may convert the strain to an operational parameter prior to transmitting data outside of the weapon system.

In certain tests, it is desirable to exclusively measure the load from the firing pin. For example, the firing pin force must be isolated when performing a muzzle down position indent test in accordance with MIL-DTL-71186A. A load bypass sleeve 210 receives a bolt force from the bolt of the weapon system 10 and substantially isolates the bolt force from being sensed by the strain sensor 208. The load bypass sleeve 210 is formed from a precipitation hardened steel or similarly stiff material. The load bypass sleeve 210 extends axially forward of and is coaxial with the forward housing 2302 and consumable impact nose 206 thereby partially enclosing the forward housing 2302. In the embodiment shown, the forward housing 2302 comprises a flange 2310 extending radially around the circumference of the forward housing 2302. A bottom surface of the load bypass sleeve 210 is in communication with a forward surface of the flange 2310.

While precipitation hardened steel is employed in one embodiment to achieve the necessary material properties for the load bypass sleeve 210, the load bypass sleeve material is not limited to precipitation hardened steel. The load bypass sleeve material may be any material which provides similar material properties including strength and stiffness.

A communication interface 50 communicatively couples the sensor assembly 200 to the data capture device 60. In the embodiment shown, a communication interface connector 212 provides a wired connection from the sensor assembly 200 to the communication interface 50. The communication interface connector 212 is in electrical communication with the strain sensor 208 and is partially housed within the interior cavity. The communication interface connector 212 extends rearward beyond the aft housing 2304. In the embodiment shown, the communication interface connector 212 comprises a coaxial communication cable for transmitting data corresponding to the sensed strain.

A guide tube 220 extends rearward from the aft housing 2304 and is sized and dimensioned for being received within a barrel 104 of the weapon. The guide tube 220 is generally a hollow cylinder with the hollow interior receiving a communication cable extending from the sensor assembly 200. The guide tube 220 provides a rigid support for the cable to facilitate easy installation into the weapon. The guide tube 220 is formed from precipitation hardened steel or a similar material. In addition, as will be explained in more detail below, in concert with the pretensioner assembly 40, the guide tube 220 pretensions the sensor assembly 200 within the chamber 102 to ensure accurate data.

While precipitation hardened steel is employed in one embodiment to achieve the necessary material properties for the guide tube 220, the guide tube material is not limited to precipitation hardened steel. The guide tube material may be any material which provides similar material properties including strength and stiffness.

Figure 3:
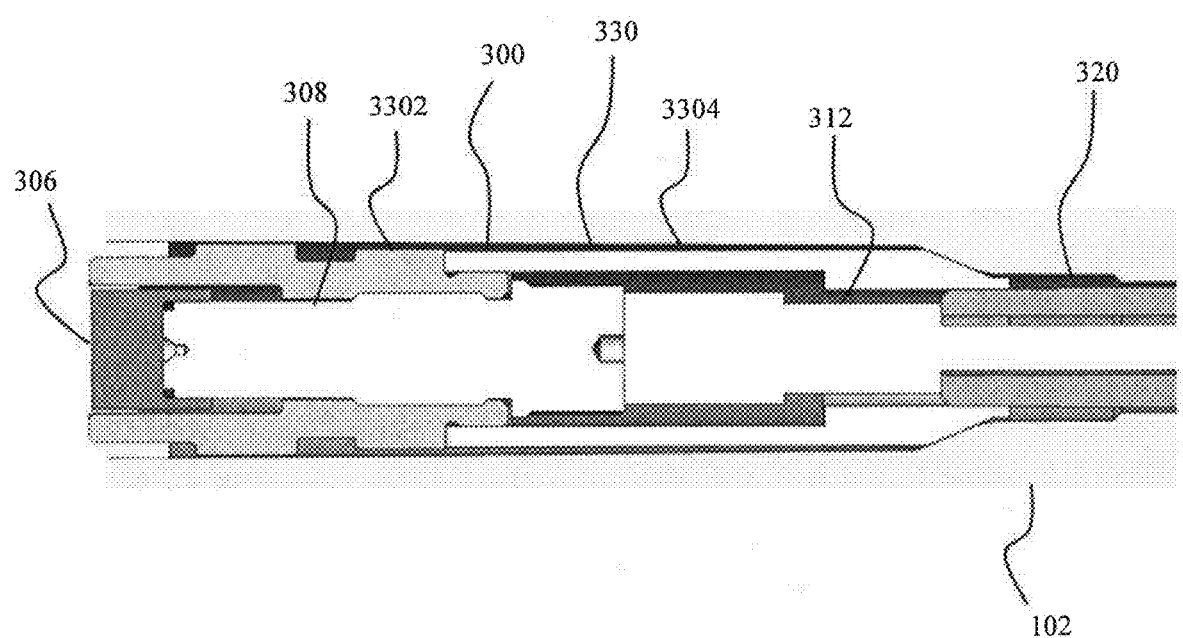
FIG. 3 is a cross-section view of a direct indent force sensor assembly of the system of FIG. 1, according to one illustrative embodiment.

FIG. 3 is a cross-section view of a direct indent force sensor assembly of the system of FIG. 1, according to one illustrative embodiment. Similar to the indirect force sensor assembly 200, the direct force sensor assembly 300 comprises a housing 330, a consumable impact nose 306, a guide tube 320 and a connector 312. However, the direct force sensor assembly 300 comprises a force sensor 308 as opposed to the strain sensor 208 of the indirect force sensor assembly 200. A force sensor 308 may be employed in applications in which the force of the firing pin is relatively weaker, such as in larger caliber weapon systems.

The forward housing 3302 and the aft housing 3304 together form a housing 330 sized and dimensioned to fit within a chamber 102 of the weapon. The housing 330 must be sufficiently stiff to receive the impact load of the firing pin, protect the internal components and ensure reliable data is collected. In one embodiment, the housing 330 is formed of precipitation hardened stainless steel or a similarly stiff material. While precipitation hardened steel is employed in one embodiment to achieve the necessary material properties for the housing 330, the housing material is not limited to precipitation hardened steel. The housing material may be any material which provides similar material properties including strength and stiffness.

The housing 330 generally conforms in shape to the chamber 102 of the weapon system and therefore to the geometry of ammunition employed in the weapon system. In the embodiment shown, the housing 330 has a generally bottleneck geometry. The housing 330 further defines an interior cavity for housing internal components of the sensor, including the force sensor 308.

In operation, the forward housing 3302 is oriented within the weapon system chamber 102 toward the firing pin. Unlike the indirect force sensor assembly 200, the forward housing 3302 does not transmit a load from the consumable impact nose 306 to the piezoelectric sensor 308. Rather, during testing, the forward housing 3302 further serves as a load bypass sleeve to isolate forces from the bolt of the weapon system 10.

The aft housing 3304 is separate from the forward housing 3302 to enable assembly of the sensor assembly 300. The aft housing 3304 is oriented within the weapon system chamber 102 toward the barrel of the weapon system 10. The aft housing 3304 transfers the load from the forward housing 3302 to the chamber 102 of the weapon system 10. The aft housing 3304 must be of a stiffness sufficient to ensure that data meets the statistical requirements. Accordingly, the aft housing 3304 is formed of a precipitation hardened steel or similarly stiff material.

The consumable impact nose 306 is forward of and in contact with the force sensor 308. In the embodiment shown, the consumable impact nose 306 comprises an opening in a base of the nose sized and dimensioned to receive a portion of the force sensor 308. The forward housing 3302 is coaxial with and surrounds outer circumference of the consumable impact nose 306.

The consumable impact nose 306 receives an impact load from the firing pin during testing and transfers the load to the force sensor. In operation, the consumable impact nose 306 is designed to absorb the impact of the firing pin and deform slightly to prevent damage to the firing pin. Accordingly, the consumable impact nose 306 is replaced after each test. In an embodiment, the consumable impact nose 306 is formed from a glass reinforced polymer, such as polyetheretherketone (PEEK).

A force sensor 308, such as a piezoelectric sensor, is located within the interior cavity of the housing 330 for sensing a force due to the load received from the consumable impact nose 308.

A communication interface 50 communicatively couples the sensor assembly 300 to the data capture device 60. In the embodiment shown, a communication interface connector 312 provides a wired connection from the sensor assembly 300 to the communication interface 50. The communication interface connector is in electrical communication with the strain sensor 308 and is partially housed within the interior cavity. The communication interface connector extends rearward beyond the aft housing 3304. In the embodiment shown, the communication interface connector comprises a coaxial communication cable for transmitting data corresponding to the sensed strain.

A guide tube 220 extends rearward from the aft housing 3304 and is sized and dimensioned for being received within a barrel 104 of the weapon. The guide tube 220 is generally a hollow cylinder with the hollow interior receiving a communication cable extending from the sensor assembly 200. The guide tube 220 provides a rigid support for the cable to facilitate easy installation into the weapon. The guide tube 220 is formed from precipitation hardened steel or a similar material. In addition, as will be explained in more detail below, in concert with the pretensioner assembly 40, the guide tube 220 pretensions the sensor assembly 200 within the chamber 102 to ensure accurate data.

Figure 4:
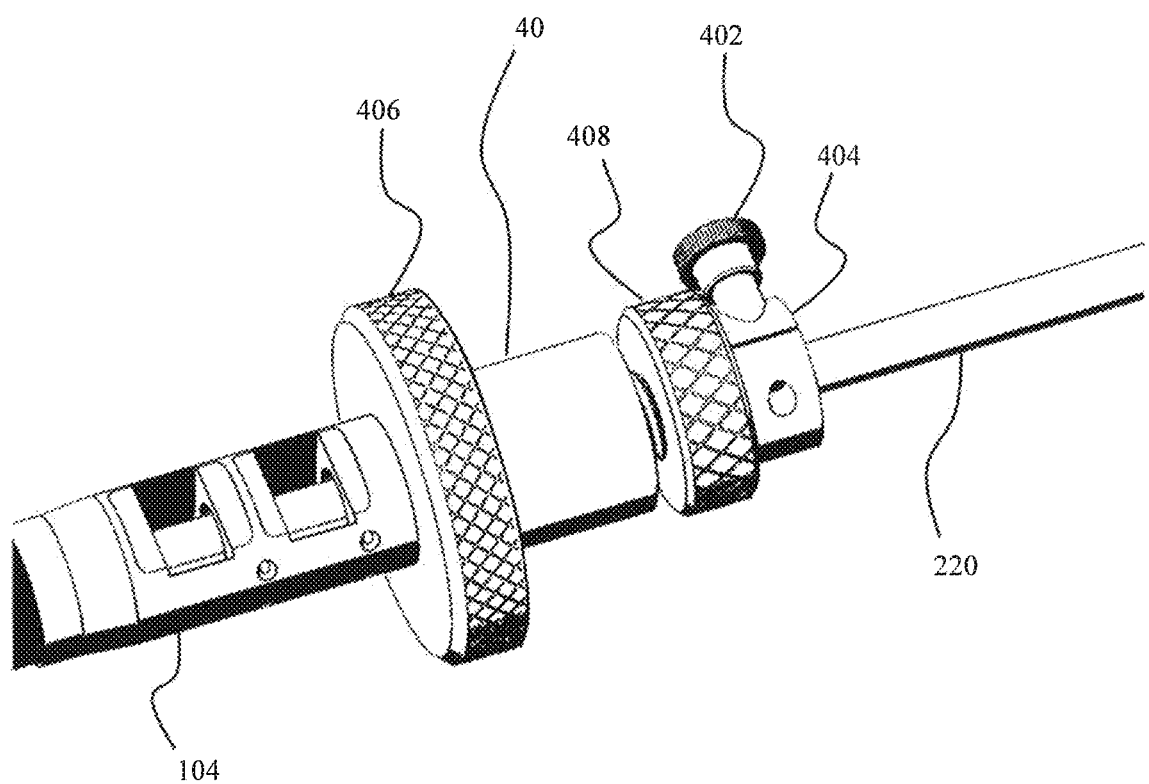
FIG. 4 is an illustration of a pretensioner assembly of the system of FIG. 1, according to one illustrative embodiment.

FIG. 4 is an illustration of a pretensioner assembly of the system of FIG. 1, according to one illustrative embodiment. The pretensioner assembly 40 ensures that the electronic sensor assembly 200 is fully seated within the chamber 102 to ensure accuracy of the data captured. The pretensioner assembly 40 comprises a rotating preloading knob 406, a stationary preloading knob 408, a split clamp 404 and a thumb screw 402.

The pretensioner assembly 40 is slidingly fit over the guide tube 220 after the in-weapon sub-system 20 has been placed within the weapon system 10. The pretensioner assembly 40 defines a hollow cavity extending axially through the pretensioner assembly 40. The hollow cavity is sized and dimensioned to receive the rigid guide tube 220 such that the pretensioner assembly 40 and guide tube 220 are substantially coaxial when assembled together.

A forward end of the pretensioner assembly 40 abuts the muzzle of the weapon system 10 when installed on the guide tube 220. Upon fitting over the guide tube 220, the pretensioner assembly 40 is fixed in position on the guide tube 220 by tightening a thumb screw 402 which tightens the split clamp 404. The weapon system 10 is then pre-loaded by tightening the rotating preloading knob 406.

A communication interface 50 communicates data from the in-weapon sub-system 20 to the data capture device 60. In addition, the communication interface 50 may be employed to provide power to the in-weapon sub-system 20. In the embodiment shown, the communication interface is a wired interface from the electronic sensor assembly 200, 300 to the data capture device 60 comprising a communication interface adapter 502 and wired communication channel 504. In the embodiment shown, the communication cable from the electronic sensor assembly 200, 300 is not compatible for use with the desired data capture device 60 which requires a larger coaxial cable as a communication channel 504. The communication cable from the electronic sensor assembly 200, 300 is communicably coupled to the larger communication cable through the communication interface adapter 502. For example, a threaded BNC adapter may communicably couple the two communication cables.

While the embodiment shown comprises a wired communication interface, in other embodiments, all or portions of the communication interface 50 may be wireless. For example, the communication interface 50 may comprise a wireless data link, such as a Wi-Fi or Bluetooth data link. The data capture device 60 receives the information from the in-weapon sub-system 20, processes, stores and displays the data to the user.

Figure 5:
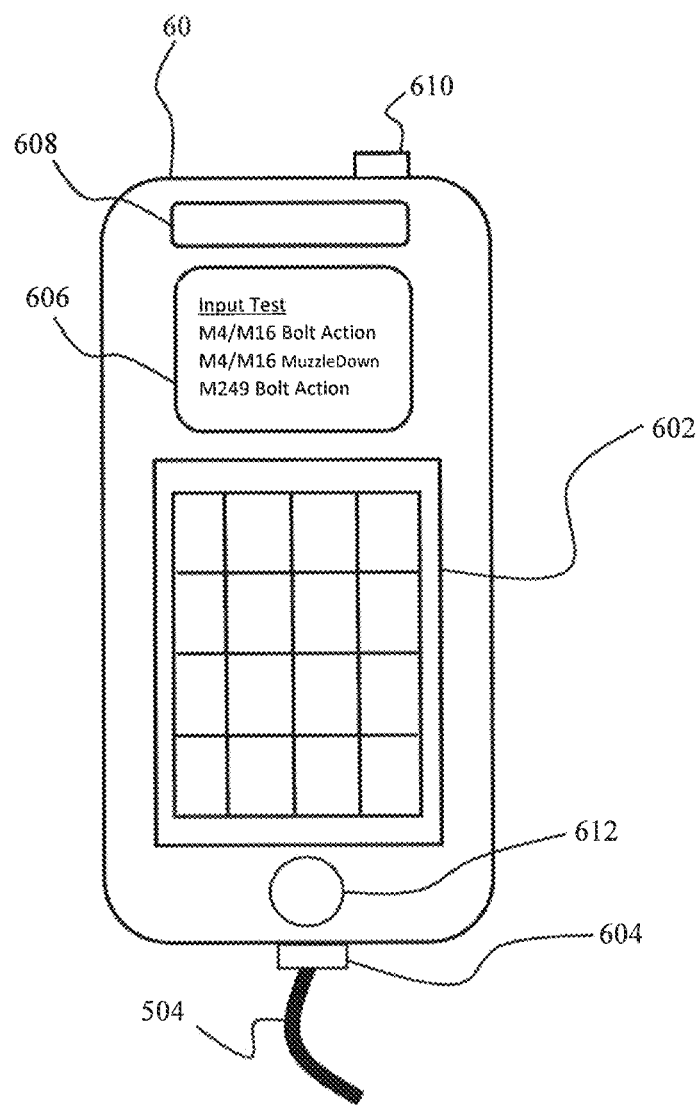
FIG. 5 is an illustration of a data capture device of the system of FIG. 1, according to one illustrative embodiment.

FIG. 5 is an illustration of a data capture device of the system of FIG. 1, according to one illustrative embodiment. In the embodiment shown, the data capture device 60 is a handheld computing device which integrates a power source, such as a lithium polymer battery, a charge amplifier and computing hardware, such as a processing unit and volatile and non-volatile memory elements, to receive, store and process data. The data capture device 60 further comprises a keypad 602 for receiving user inputs, a communication interface port 604 for receiving the communication interface, a display 606, one or more visual indicators 608, a memory port interface 610 and in some embodiments, may further comprise an audible indicator 612.

The data capture device 60 receives the data from the in-weapon sub-system 20 and processes the data to determine the operational parameters of the firing pin. For example, the data capture device 60 may convert a sensed strain to a corresponding operational parameter, including the indent force, impulse and/or energy of the firing pin based on a static calibration. The data capture device 60 provides an indication of the operational parameter to the test operator. In one embodiment, the data capture device displays a value for the operational parameter on the display 606 or alternatively, provides a visual indication of the whether the force meets a threshold by illuminating one or more of the visual indicators 608. In other embodiments, the indication may be audible from the audible indicator 612, such as a speaker, rather than solely visual.

The keypad 602 may receive inputs from a user. For example, in conjunction with information displayed on the display 606, the user may input one or more test parameters such as type of weapon being tested, type of sensor being employed or type of test being executed, such as bolt action indent test or muzzle down position indent test.

A memory port interface 610, such as a memory card interface or a USB port allows for transmission and external storage of the testing information.

Figure 6:
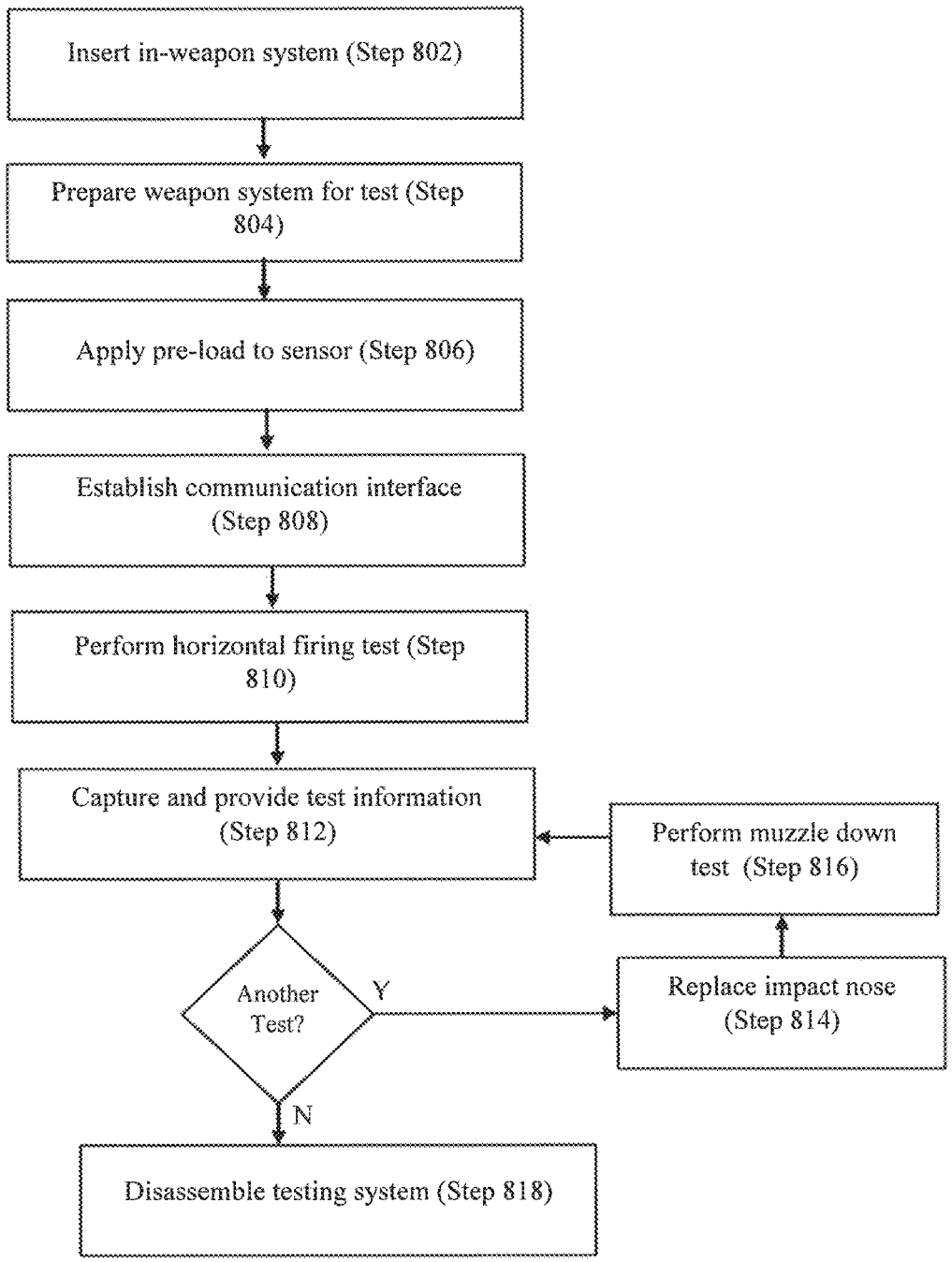
FIG. 6 is a flowchart illustrating a method for measuring the firing pin indent force of a weapon system, according to one illustrative embodiment.

FIG. 6 is a flowchart illustrating a method for measuring the operational parameters of a weapon system, according to one illustrative embodiment.

In step 802, the in-weapon sub-system 20 is inserted into the weapon system 10. To insert the in-weapon sub-system 20, the weapon system 10 is opened. For example, to test a rifle, the takedown pin of the rifle is retracted and the upper receiver is pivoted open. The electronic sensor assembly 200, 300 is inserted into the empty chamber 102 of the weapon system 10 and the guide tube 220 is inserted into the barrel 104.

In step 804, the weapon system 10 is prepared for testing. For rifles, the upper receiver is pivoted closed and the takedown pin is reinserted.

In step 806, the pretensioner assembly 40 is applied to the testing assembly and a preload is applied to the electronic sensor assembly 200, 300. The pretensioner assembly 40 is slid over the portion of the guide tube 220 extending from the weapon system barrel 104 such that it abuts the muzzle of the weapon system 10. The pretensioner assembly 40 is then secured in place by tightening the thumb screw 402 of the split clamp 404. The preload is applied to the electronic sensor assembly 200, 300 by the pretensioner assembly 40 by tightening a rotating preloading knob 406.

In step 808, a communication interface 50 is established between the data capture device 60 and the electronic sensor assembly 200, 300. In some embodiments, the communication cable from the electronic sensor assembly 200, 300 may not be suitable for use with the desired data capture device 60. In such instances, the communication cable from the electronic sensor assembly 200, 300 is communicably coupled to a communication cable 504 which is more suitable for use through a communication interface adapter 502. For example, a threaded BNC adapter may communicably couple the two communication cables.

Firing tests performed will be dependent on the weapon system being tested and the information desired. In the embodiment described herein, the method is described in the context of a rifle/carbine being tested in accordance with MIL-DTL-71186A, the entirety of which is hereby incorporated by reference. MIL-DTL-71186A mandates a bolt action indent test and a muzzle down position indent test. The bolt action indent test is a horizontal firing test in which the trigger is pulled to ensure that the minimum operational parameters are met. The muzzle down position indent test ensures that the maximum operational parameters are not exceeded by pointing the muzzle downward and pulling back the bolt carrier assembly and then releasing. While systems and methods are described in the context of these tests, the systems and methods are not limited to performing these two tests.

In step 810, a first firing test is performed to measure one or more operational parameters of the firing pin. In the embodiment described, a bolt action indent test is performed. The charging handle is pulled. The weapon is oriented horizontally. The trigger is pulled. The electronic sensor assembly 200, 300 senses an effect, such as either the force of the firing pin or the strain attributed to the firing pin, and transmits data associated with the effect to the data capture device 60.

In step 812, test information is provided to the user. The data capture device 60 receives the information from the electronic sensor assembly 200, 300. The data capture device 60 processes the data and provides it to the user for evaluation. In one embodiment, the data capture device 60 displays an operational parameter, including the indent force, impulse and/or energy of the firing pin on the firing pin on the display 606. In another embodiment, the data capture device 60 compares the operational parameter, including the indent force, impulse and/or energy of the firing pin to a threshold value and provides a pass fail indication to the user. The pass fail indication may comprise an illumination of one or more visual indicators 608.

In certain embodiments, it may be desirable to perform a second test. For example, MIL-DTL-71186A mandates that a muzzle down position indent test be performed.

In step 814, the consumable impact nose 206 is replaced. The weapon system 10 is opened to provide access to the electronic sensor assembly 200, 300 by, for example, removing the takedown pin and pivoting the upper receiver. The consumable impact nose 206 is removed from the electronic sensor assembly 200, 300 and replaced by an unused consumable impact nose 206. The weapon system 10 is then closed by, for example, pivoting the upper receiver closed and reinserting the takedown pin.

In step 816, a muzzle down position indent test is performed in accordance with MIL-DTL-71186A to measure the force of the firing pin while the weapon is oriented with the muzzle facing downward. The bolt is retracted and locked. The weapon is oriented vertically with the muzzle pointed downward and the bolt carrier is released from the full recoil position. The electronic sensor assembly 200, 300 senses either the force of the firing pin or the strain attributed to the firing pin and transmits this information to the data capture device 60.

Step 812 is then repeated to present the information to the user.

In step 818, the testing assembly is disassembled. The communication cables are disconnected from each other. The weapon is opened and the pretensioner assembly 40 is removed. The sensing assembly is then removed. The consumable impact nose 206 is discarded and the weapon system 10 is closed.

While the invention has been described with reference to certain embodiments, numerous changes, alterations and modifications to the described embodiments are possible without departing from the spirit and scope of the invention as defined in the appended claims, and equivalents thereof.

What is claimed is:

1. A sensor assembly for measuring an operational parameter of a firing pin, the sensor assembly comprising:
   a housing sized and dimensioned to fit within a chamber of a weapon system, said housing having a forward end oriented toward the firing pin and an aft end oriented toward a barrel of the weapon system and further defining an interior cavity;
   an impact nose positioned at the forward end of the housing and having an exposed front surface for receiving a firing pin impact load from the firing pin;
   a sensor located within the interior cavity of the housing for sensing an effect of the firing pin impact load;
   a load bypass sleeve coaxial with and substantially surrounding a circumference of the impact nose and positioned to receive a bolt impact load from a bolt of the weapon system; and
   a communication interface for transmitting data corresponding to a sensed effect from the sensor assembly.

2. The sensor assembly of claim 1 wherein the operational parameter comprises one or more of the following: a firing pin force, a firing pin impulse and a firing pin energy.

3. The sensor assembly of claim 1 wherein the impact nose permanently deforms in response to receiving the firing pin impact load directly from the firing pin.

4. The sensor assembly of claim 3 wherein the impact nose is formed from a polymer.

5. The sensor assembly of claim 1 further comprising a guide tube partially housed within and extending aft of the housing, the guide tube sized and dimensioned for being received within a barrel of the weapon and further defining a hollow central interior for receiving a communication cable.

6. The sensor assembly of claim 5 wherein the guide tube applies a preload force on the sensor assembly such that sensor assembly is tensioned with respect to the chamber of the weapon system.

7. The sensor assembly of claim 1 wherein less than five percent of a bolt impact load applied to the load bypass sleeve is sensed by the sensor.

8. The sensor assembly of claim 1 wherein the sensor is a strain sensor for measuring a strain experienced in response to the firing pin impact load.

9. The sensor assembly of claim 8 wherein the strain sensor is a piezoelectric strain sensor.

10. The sensor assembly of claim 8 wherein the housing completely surrounds the strain sensor and wherein the impact nose is positioned forward of and in contact with the housing.

11. The sensor assembly of claim 8 wherein the sensor assembly is for use in a weapon system which is chambered for 5.56 mm center fire rifle ammunition.

12. The sensor assembly of claim 1 wherein the load path of the sensor is from the impact nose to the sensor and does not comprise the housing.

13. The sensor assembly of claim 12 wherein the force sensor is a piezoelectric force sensor.

14. The sensor assembly of claim 12 wherein a surface of the force sensor is in contact with the impact nose.

15. The sensor assembly of claim 12 wherein the load bypass sleeve is integral to the housing.

16. A system for measuring an operational parameter of a firing pin of a weapon system, the system comprising:
- a sensor assembly, the sensor assembly further comprising
  - a housing sized and dimensioned to fit within a chamber of a weapon system and defining an interior cavity,
  - an impact nose positioned at a forward end of the housing and having an exposed front surface for receiving a firing pin impact load from the firing pin;
  - a sensor located within the interior cavity of the housing for sensing an effect of the firing pin impact load;
  - a load bypass sleeve coaxial with and substantially surrounding a circumference of the impact nose and positioned to receive a bolt impact load from a bolt of the weapon system;
- a communication interface for transmitting data corresponding to a sensed effect from the sensor assembly;
- a guide tube extending aft of the housing and sized and dimensioned for being received within and extending beyond a barrel of the weapon and further defining a hollow central interior for receiving a communication cable of the communication interface;
- a pretensioner assembly defining a hollow central interior sized and dimensioned to receive a portion of the guide tube, wherein the pretensioner assembly applies a preload on the sensor assembly via the guide tube such that sensor assembly is tensioned with respect to the chamber of the weapon system; and
- a data capture device for receiving the sensed load and providing an indication of the sensed load.

17. The sensor assembly of claim 16 wherein the operational parameter comprises one or more of the following: a firing pin force, a firing pin impulse and a firing pin energy.

18. The system of claim 16 wherein the sensor is a strain sensor for measuring a strain experienced in response to the firing pin impact load and wherein the housing completely surrounds the strain sensor and the impact nose is positioned forward of and in contact with the housing.

19. The system of claim 16 wherein the sensor is a force sensor for measuring a force experienced in response to the firing pin impact load wherein a surface of the force sensor is in contact with the impact nose.

\* \* \* \* \*